United States Patent [19]

Noodleman

[11] 3,892,987
[45] July 1, 1975

[54] COMMUTATING METHOD AND APPARATUS FOR DC PERMANENT MAGNET MACHINES

[75] Inventor: Samuel Noodleman, Blacksburg, Va.

[73] Assignee: Kollmorgen Corporation, Hartford, Conn.

[22] Filed: Jan. 30, 1974

[21] Appl. No.: 437,907

[52] U.S. Cl. .................. 310/46; 310/219; 310/128
[51] Int. Cl. .......................................... H02k 37/00
[58] Field of Search ......... 310/67, 40 MM, 46, 128, 310/219, 156, 231, 224, 229, 230, 177, 239, 241, 242, 245, 247, 238, 40, 270; 318/541

[56] References Cited
UNITED STATES PATENTS

| | | | |
|---|---|---|---|
| 2,747,116 | 5/1956 | Poole | 310/128 |
| 3,341,726 | 9/1967 | Brinster | 310/219 |
| 3,396,296 | 8/1968 | Esters | 310/46 |
| 3,534,203 | 10/1970 | Sommeria | 310/46 |
| 3,603,823 | 9/1971 | Mason | 310/46 |
| 3,631,273 | 12/1971 | Stein | 310/46 |
| 3,678,359 | 7/1972 | Peterson | 310/46 |
| 3,769,535 | 10/1973 | Bates | 310/219 |

FOREIGN PATENTS OR APPLICATIONS

| | | | |
|---|---|---|---|
| 1,272,805 | 8/1961 | France | 310/46 |

*Primary Examiner*—R. Skudy
*Attorney, Agent, or Firm*—Morgan, Finnegan, Durham & Pine

[57] ABSTRACT

A DC permanent magnet machine in which the functions typically attributed to the stator and rotor assemblies are reversed to provide an "inside out" design. The stator is provided with a plurality of electrically energizeable poles, the windings of which are electrically coupled to associated pairs of commutator bars incorporated within an annular array. The stator further includes first and second conductive rings, each being electrically connected to respective polarities of DC source. The rotor is provided with a plurality of poles equal in number to the poles provided in the stator. First and second groups of ring brushes and associated commutator brushes are anchored to the rotor. The first and second groups of ring brushes respectively slidably engage the first and second conductive rings. The ring brushes comprising said first group and the ring brushes comprising said second group are each electrically connected to an associated commutator brush. The commutator brushes are arranged in annular fashion and make progressive sliding engagement with the commutator bars of the stator assembly providing electrical power to associated coils of the stator winding. The interaction of the magnetic field created by the energized stator coils and the fields of the permanent magnets in the rotor assembly causes rotation of the rotor which, in turn, rotates the ring brushes and commutator brushes to continuously and progressively switch the DC source to succeeding stator coils.

9 Claims, 15 Drawing Figures

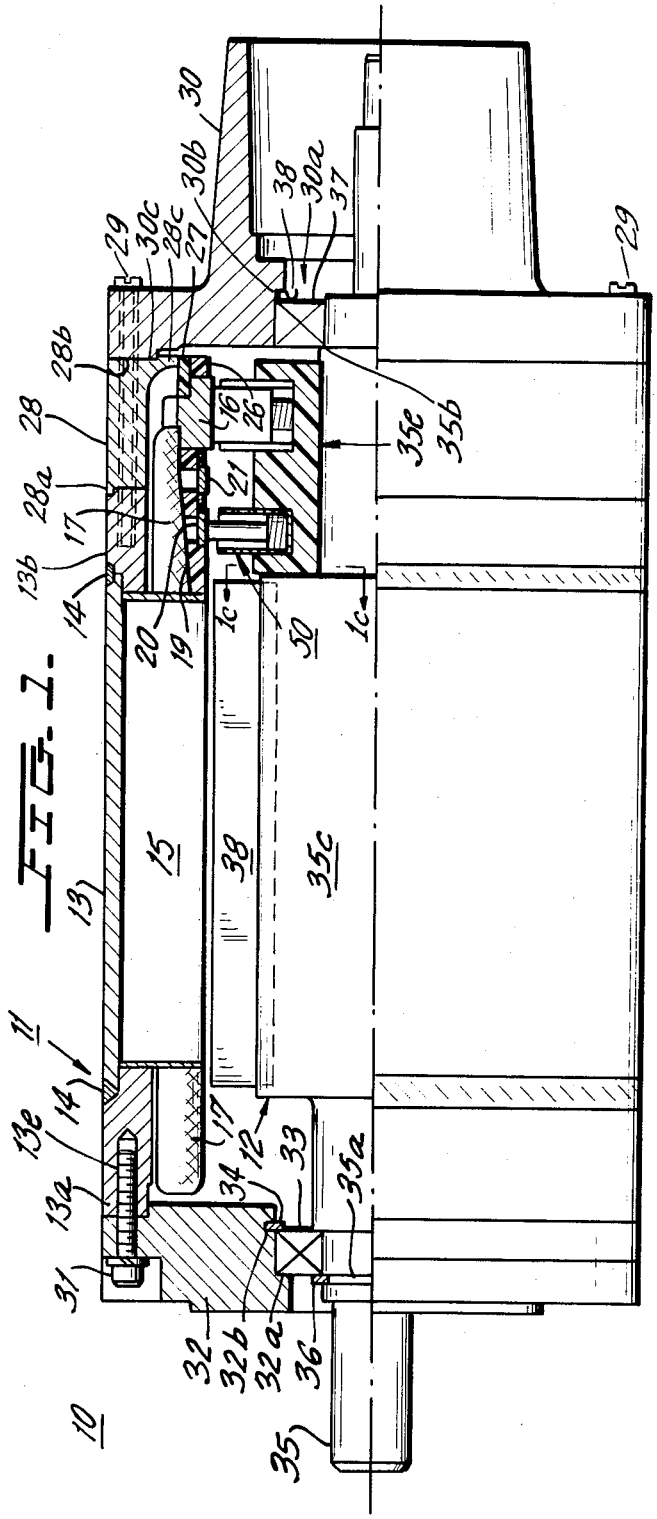
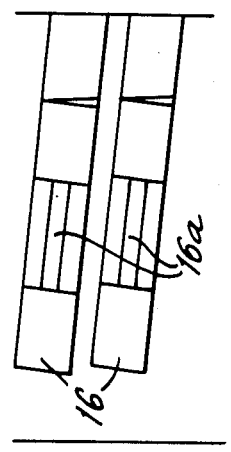
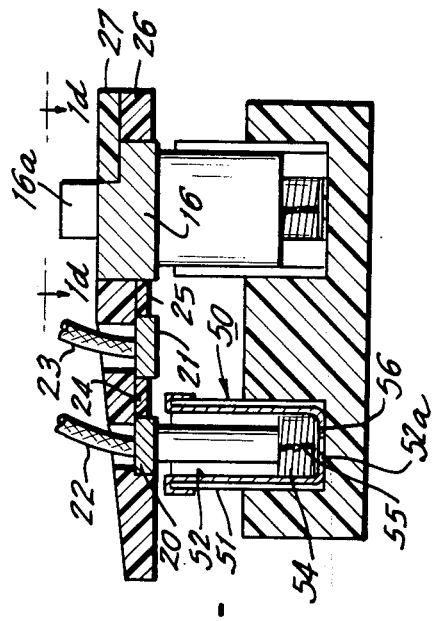

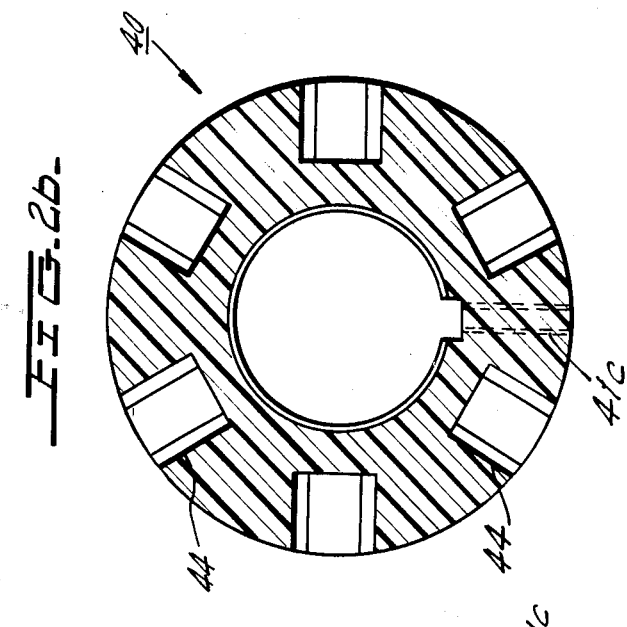
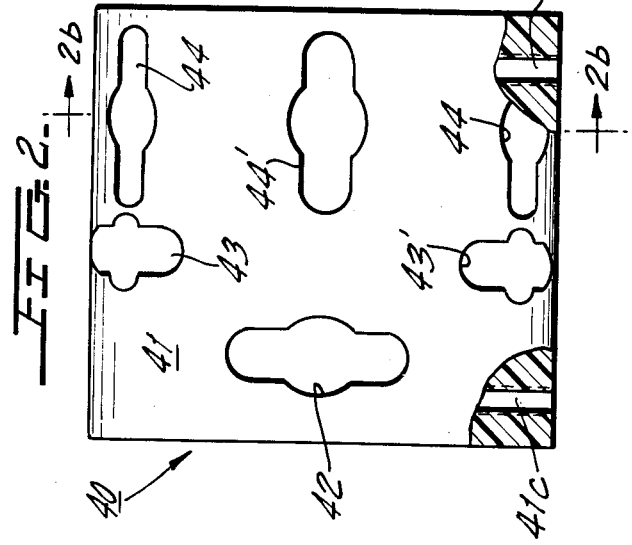
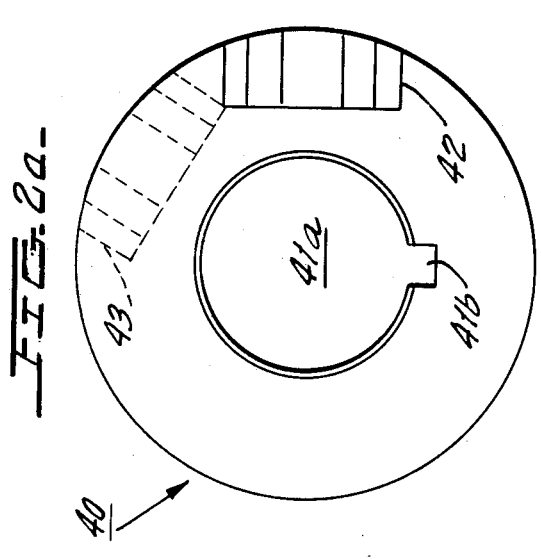
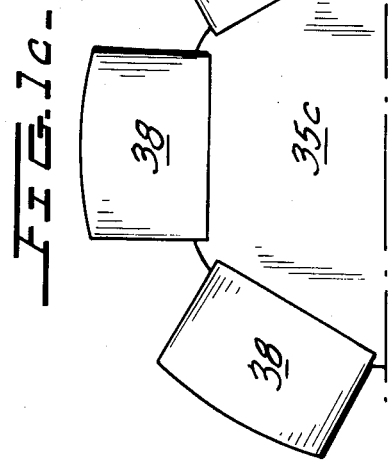
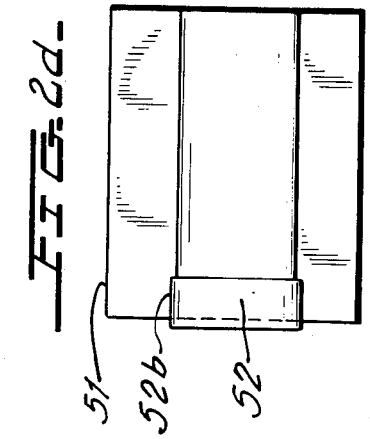
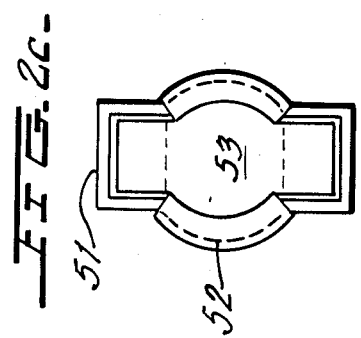

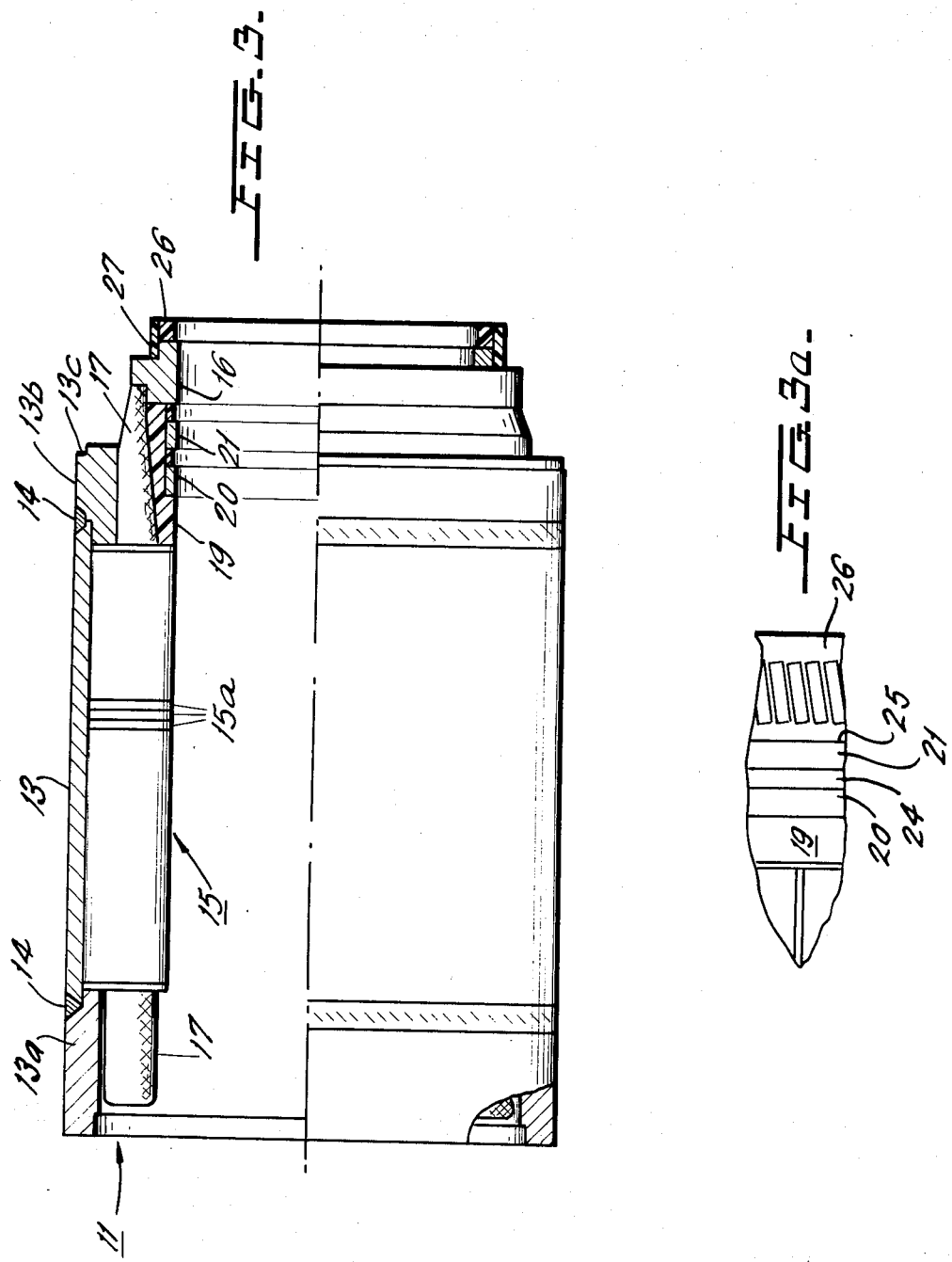

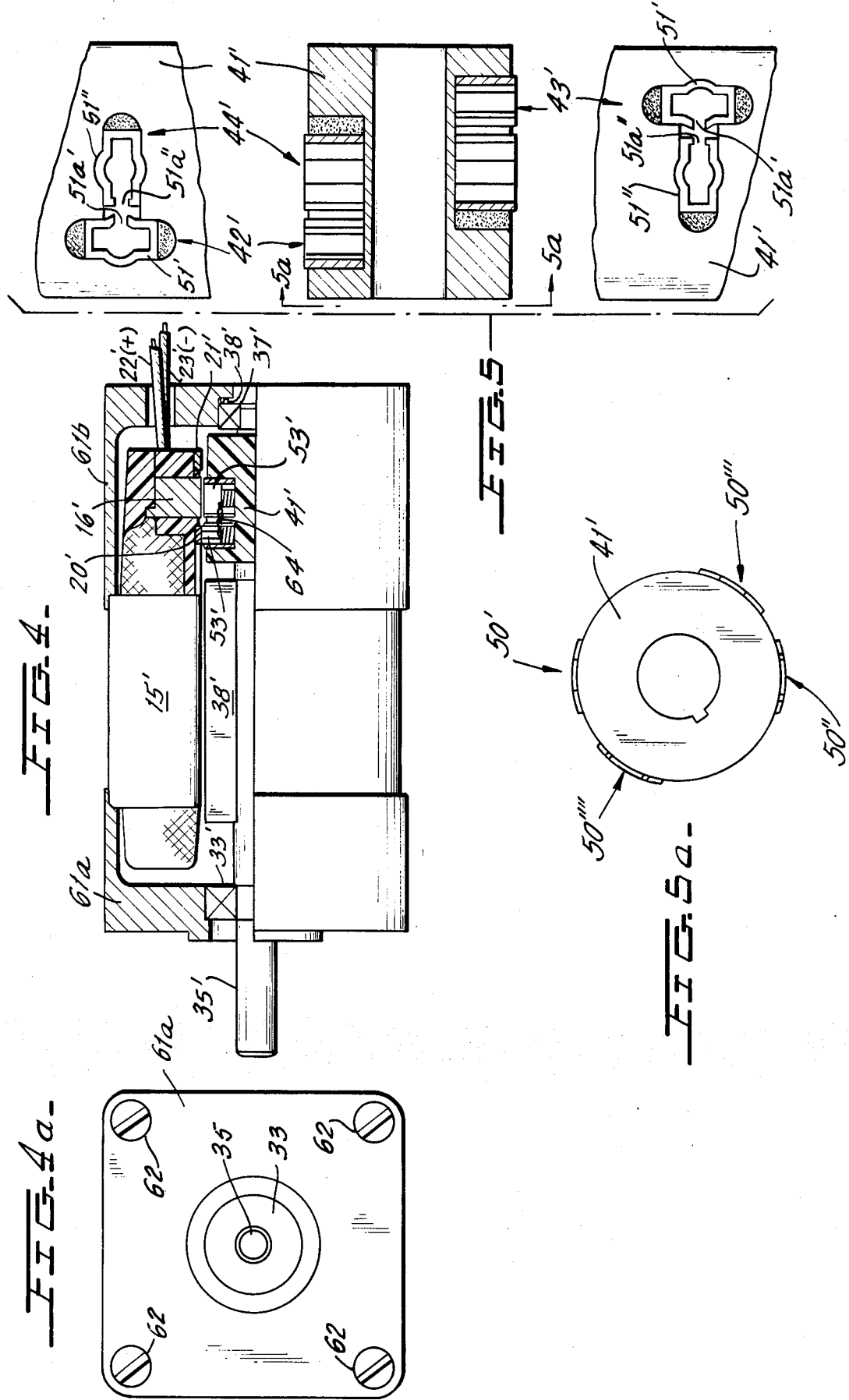

COMMUTATING METHOD AND APPARATUS FOR DC PERMANENT MAGNET MACHINES

BACKGROUND OF THE INVENTION

DC motors of conventional design typically utilize a multi-pole permanent magnet stator and a rotor having a plurality of energizable conductors arranged about the surface thereof and parallel to the axis of rotation. Pairs of said conductors are electrically energized by rotating commutator bars provided on the rotor, which commutator bars are electrically energized by a DC source through stationary commutator brushes which make wiping engagement with the commutator bar array. Interaction of the stator permanent magnet fields with the magnetic fields created by DC energization of the rotor conductors provides for rotation of the rotor, whereby relative rotation of the commutator bars and commutator brushes continuously changes the electrical connections between the DC source and the array of conductors in the rotor.

The high inertia of such DC motors has led to the development of the inside out motor design in which the multi-pole rotor is provided with permanent magnet members and the stator is provided with an equal number of poles whose windings are energized by the DC source. This design provides a rotor with lower inertia for a given peak torque, and a stator having greater copper volume and better head dissipation as compared with conventional DC motor designs. Thus, the inside out motor design has a higher continuous rating in contrast to conventional DC motors of the same size and weight.

The problems of commutation in motors of the inside out type has led to the development of a DC brushless type motor which employs electronic amplifiers and other solid state circuit elements to provide the necessary commutation. The electronic amplifiers and circuit elements required for proper switching of power to the stator windings to generate the rotating field add significant cost and weight to the motor. The solid state switching circuitry also increases motor "cogging" which occurs during low speed motor operation.

BRIEF DESCRIPTION OF THE INVENTION

The numerous problems and disadvantages encountered in DC motors of both the conventional and inside out design has led to the development of the present invention which is characterized by providing a method of commutating the motor windings through the use of a novel electro mechanical switching arrangement in which the stator assembly is provided with first and second annular conductive rings and an array of commutator bars. The rotor assembly is provided with the first and second arrays of ring brushes which revolve with the rotation of the rotor shaft and engage, respectively, the first and second conductive rings. The ring brushes are each electrically connected to associated commutator brushes which in turn wipingly engage the stator mounted commutator bars to simultaneously couple the opposite terminals of each of the stator coils to the opposite polarities of the DC source so as to progressively energize the stator coils whose magnetic fields interact with the rotating magnetic fields of the rotor permanent magnets to effect and sustain rotation of the rotor shaft.

It is therefore one object of the present invention to provide a novel commutation method and construction in which DC power supplied to the rotor through the stator is commutated to stator windings by a rotor mounted brush ring assembly.

Another object of the present invention is to provide a novel method and design for commutation of DC motors in which first and second continuous conductive rings, respectively coupled to opposite polarities of a DC source, are continuously slidably engaged by first and second arrays of ring brushes which sequentially and progressively energize stator windings through rotor mounted commutator brushes electrically coupled to said ring brushes.

Still another object of the present invention is to selectively and progressively couple the coils of a stator with the opposite polarities of an energizing source by means of ring brushes which form part of the rotor and which progressively engage conductive rings forming a part of the stator and commutator brushes, also forming part of the rotor, which are electrically connected to the ring brushes, the commutator brushes being adapted to engage the commutator bars forming part of the stator to effect rotation of the rotor shaft.

BRIEF DESCRIPTION OF THE DRAWINGS

The above as well as other objects of the present invention will become apparant from the accompanying description and drawings which form part of the specification and in which:

FIG. 1 is a partial sectional view of a motor design incorporating the principles of the present invention;

FIG. 1a shows an enlarged view of the commutation array in the motor of FIG. 1;

FIG. 1b is a view of the commutator bar array looking in the direction of arrows 1d—1d of FIG. 1a;

FIG. 1c is a partial sectional view of the rotor permanent magnet assembly of the motor shown in FIG. 1 taken along the line 1c—1c of FIG. 1;

FIG. 2 shows a top view of an alternative embodiment of the rotor mounted brush ring actuator of FIG. 1;

FIG. 2a shows an end view of the brush ring actuator of FIG. 2;

FIG. 2b shows a sectional view of the brush ring actuator of FIG. 2;

FIGS. 2c and 2d show enlarged end and side view respectively of the brush holders of FIG. 1;

FIG. 3 shows an enlarged sectional view of the stator assembly of FIG. 1;

FIG. 3a shows an enlarged view of the commutator and ring assemblies of FIG. 3 looking in the direction of arrows 3c—3c;

FIG. 4 is a side view, partially sectionalized, of another embodiment of the present invention;

FIG. 4a shows an end view of the machine of FIG. 4;

FIG. 5 shows a sectional view of the rotor brush ring assembly of FIG. 4; and

FIG. 5a shows an end view of the brush ring assembly of FIG. 4.

DETAILED DESCRIPTION OF THE INVENTION

One embodiment 10 of the DC motor embodying the novel commutation technique is depicted in FIGS. 1-3a and is comprised of a stator assembly 11 and a cooperating rotor assembly 12. The stator comprises a first elongated hollow cylindrical housing portion 13 having its opposite ends welded to relatively short ring-shaped housing members 13a and 13b the weldments being shown at 14. The stator has a laminated stator core 15 having individual laminations which are preferably stamped from plates for suitable magnetic material.

The group of laminations forming stator core 15 have multi-turn coils wound thereon. Numeral 17 designates the stator winding shown in FIGS. 1 and 3 in simplified fashion. Diametrically opposed coils are electrically connected to one another so as to be coupled in electrical series. The remaining electrical terminal of each coil is connected to an associated commutator bar 16. The commutator bars 16 are arranged in an annular array in an equispaced manner and are adapted to be physically engaged by associated commutator brushes as will be described in greater detail below.

Annular shaped insulating member 19 secures conductive rings 20 and 21 which are cylindrically shaped conductive members, each being electrically connected to one polarity of a DC source through insulated wires 22 and 23, respectively. A pair of ring shaped insulators 24 and 25 serve to electrically insulate the rings 20 and 21 and the bars 16 from one another. The outwardly extending projections 16a of commutator bars 16 (FIG. 1b) serve to facilitate electrical connection between the bars 16 and the coils of winding 17. Insulator rings 26 and 27 secure commutator bars 16 and further serve to electrically insulate bars 16 from the conductive cylindrical housing portion 28 whose projecting rim 28a is received by a notch 13c in housing member 13b.

Spacer member 28 is provided with a plurality of smooth bores (see 28b-FIG. 1) which are aligned with a like number of tapped holes (see 13e-FIG. 1) for receiving fasteners 29 which serve to secure end plate 30 and spacer 28 to stator housing member 13b. The shoulder 28b of spacer 28 likewise interfits with the complementary shaped mating surface 30c of end plate 30. The inwardly directed end portion 28c receives the insulator ring 27. In a like manner stator housing member 13a is provided with a plurality of tapped openings (see 13e-FIG. 1) which receive threaded fasteners 31 to secure end plate 32 to stator housing member 13a.

End plate 32 has an annular shaped seat 32a for shaft bearing 33 which is secured to end plate 32 by a retaining ring 34 which is seated in an annular groove 32b. The rotor shaft 35 is restrained from experiencing any linear movement by means of retaining ring 36 which bears against a marginal edge of bearing 33 and is seated in groove 35a provided in shaft 35.

End plate 30 has a central opening 30a through which rotor shaft 35 protrudes. An annular seat 30b in plate 30 receives bearing 37. An annular shaped spring washer 38 having an S-shaped cross section serves to provide a cushioned mounting for the rotor assembly. The shoulder 35b on shaft 35 rests against the inner marginal edge of bearing 37.

The rotor assembly 12 is comprised of rotatable shaft 35 which is fitted within the hollow interior of the stator assembly. The central portion 35c of the rotor shaft is of enlarged diameter relative to the ends and is provided with axially aligned grooves for receiving a plurality of elongated permanent magnet members 38 bonded into position (FIG. 1c).

A brush ring assembly 40 comprising a drum 41 (FIGS. 1 and 2-2d) is mounted upon portion 35e of the rotor shaft by means of its central opening 41a which has a keyway 41b for receiving a pair of fasteners (not shown) which threadedly engage radially aligned tapped openings 41c to lock drum 41 to shaft portion 35e.

The actuator drum is formed of an insulating material and is provided with a plurality of brush assembly openings 42-44 each adapted to receive a brush assembly. In the preferred embodiment there are three openings 42; three openings 43, and six openings 44. The openings 42 receive brush assemblies whose brushes wipingly engage conductive ring 20. In a like manner, the brushes mounted in openings 43 wipingly engage conductive ring 21 and the brushes mounted in openings 44 wipingly engage the commutator bars 16.

FIGS. 1 and 2c show a brush assembly 50 comprising a brush holder 51 containing a U-shaped clamp 52. The free ends 52b are bent downwardly about holder 51 (FIG. 2d). The brush 53 is slidably mounted within holder 51 and the central portion of brush 53 slidably engages clamp 52 (FIG. 2c). A helical spring 54 rests on the base 52a of clamp 52 and urges brush 53 toward engagement with conductive ring 20. A conductor 55 is electrically connected to the bottom of brush 53 and has its opposite end electrically connected to a contact button 56. Each remaining brush assembly is similar in design and function to the assembly 50 described hereinabove.

The brush assemblies mounted in openings 42 are each electrically connected to associated brush assemblies in certain of the openings 44. Likewise, the assemblies mounted in openings 43 are electrically connected to associated brush assemblies in the remaining openings 44. For example, as shown in FIG. 2, the brush in opening 42 is electrically connected to the brush in opening 44' while the brushes in openings 43 and 43' are electrically connected to the brushes in openings 44 and 44''. The actual electrical connections are omitted for purposes of simplicity.

As shown in FIG. 1b, the commutator bars 16 are offset at an angle relative to the longitudinal axis of the motor and hence are likewise offset relative to the commutator brushes placed in openings 44 which cause a "make-before-break" contact action between the commutator brushes and commutator bars.

Operation of the motor of FIGS. 1-2d is as follows. An electrical path extends from one terminal of the DC source, through lead 22, to conductive ring 20. The brushes (three, in preferred embodiment) in openings 42 continuously wipingly engage conductive ring 20 regardless of the angular orientation of the rotor assembly. The other terminal of the DC source is electrically connected to conductive ring 21 through lead 23 and through the brushes in openings 43 which wipingly engage ring 21. The brush in opening 42 thereby couples one terminal of the DC source to the brush in opening 44' while the brush in the opening 43 couples the other terminal of the DC source to the brush in opening 44.

There are six brushes in the six openings 44. Three of the brushes are coupled to "+" while the remaining three are coupled to "−". Each + brush is paired with a diametrically opposed − brush to couple DC power across a pair of diametrically opposed commutator bars 16 thereby energizing a pair of series connected diametrically opposed coils of the stator winding 17. The stator coils cooperate with the stator laminated core to generate a magnetic field which interacts with magnetic fields created by the permanent magnet members of the rotor assembly to cause rotation of the rotor. The six brushes in openings 44 then progressively move into wiping engagement with the next three pairs of commutator bars to sustain rotor rotation.

In the embodiment shown in FIGS. 1–2d, the motor is of six pole design utilizing six permanent magnets 38 in the rotor assembly and three pairs of + and − brushes in openings 44. It should be understood, however, that a greater or lesser number of poles may be utilized in the motor, depending upon the needs of the user. The six pole motor disclosed herein has been found to provide smooth operation at slow speeds.

It is generally accepted that energizing windings utilizing the DC brushless concept requires relatively large numbers of solid state components in an electronic control circuit in order to develop the large number of commutator bar segments which are necessary for smooth operation at slow speeds. In view of the foregoing, another application of the present invention would be to use the switching techniques described herein to effect smooth motor operation at slow speeds, and then switch to a static control incorporating a smaller number of solid state circuit elements to energize the windings during high speed operation. Such an arrangement would serve to provide a smooth operating motor at slow speeds and to provide the long life operation of the DC brushless control circuit for high speed conditions.

The novel DC motor described herein, in contrast to conventional DC motors, permits the use of a rotor assembly having a relatively small mass and a corresponding low moment of inertia. Moreover, the permanent magnet members may be of the ceramic type to further reduce the mass of the rotor assembly. Effecting commutator switching in the stator assembly permits the use of a larger copper volume which significantly reduces the amount of heating occurring in the electrically energized stator assembly, which serves to prolong the useful operating life of the motor. Also, having the windings in the stator eliminates the stress normally experienced by the rotor-mounted windings, thereby prolonging the life of the windings and the motor.

FIGS. 4–5a show another embodiment of the present invention which employs the commutation techniques previously described and wherein like elements are designated by like but primed numerals. Exemplary embodiment 60 is comprised of housing members 61a and 61b, shown partially sectionalized for purposes of simplicity. The housing end portions have circular shaped openings for receiving the stator assembly winding. However, the end portions have square shaped exteriors which are each provided with aligned elongated openings in their corners to receive fasteners 62 (FIG. 4a) to secure end portions 61a and 61b to one another and thereby secure the stator assembly therebetween. The right-hand end of housing portion 61b is provided with a bearing 37' for mounting rotor shaft 35' having secured thereto an array of permanent magnets 38'. A brush ring actuator 41' formed of a suitable insulating material is rigidly secured to shaft 35' in a suitable manner.

A plurality of brush assemblies 50' are secured in openings 42'–44' in drum 41' in a suitable manner and the brushes are biased radially outwardly so as to wipingly engage commutator bars 66, and conductive rings 20' and 21'. The openings 42' communicate with selected ones of the openings 44' to form "T-shaped" openings. Likewise openings 43' communicate with the remaining openings 44' to similarly form T-shaped openings. The brush holders 51' are severed at 51a' to communicate with the severed portion 51a'' in brush holder 51''. This arrangement provides a direct channel for a conductor 64 (see FIG. 4) to be directly connected between brushes 53' (FIG. 4). The rounded ends of the openings are filled with an epoxy after the holders are inserted. In all other respects the brush assemblies of FIGS. 4–5a are the same. As shown in FIG. 4, the stator conductive rings 20' and 21' are positioned on opposite sides of the commutator bars 16'.

The embodiment of FIGS. 4–5a is a four-pole motor. There are two pairs of commutator brushes (50'-50'' and 50'''-50''''; see FIG. 5a). However, the operation is the same as that described for the embodiment of FIGS. 1–3a.

The invention disclosed and claimed herein is not limited to the specific mechanisms and techniques herein shown and described since modifications will undoubtedly occur to those skilled in the art. Hence, departures may be made from the form of the instant invention without departing from the principles thereof.

What is claimed is:

1. Switching apparatus for a machine responsive to a source of DC power and having interacting rotor and stator assemblies which rotate relative to each other, the rotor having at least a two-pole permanent magnet structure for creating a magnetic field and the stator having a winding with a plurality of energizeable coils arranged at spaced intervals around the stator, said coils having an array of commutator bars associated therewith for supplying electrical power thereto for progressively creating magnetic fields in said stator which interact with those in said rotor, said apparatus comprising:
   a. first and second spaced conductive rings associated with said stator, said conductive rings being positioned proximate said commutator bars;
   b. means for respectively coupling each of said conductive rings to opposite polarities of said DC source; and
   c. first and second actuating means associated with said rotor, said first and second actuating means being adapted to progressively and sequentially electrically couple said first and said conductive rings to the commutator bars during the relative rotation so as to momentarily and progressively couple each coil to both polarities of said source and to couple each subsequent coil across said source before the preceding coil is decoupled from said source.

2. The switching apparatus of claim 1 wherein said first and second conductive rings are disposed on one side of said array of commutator bars.

3. The switching apparatus of claim 1 wherein said first and second conductive rings are disposed on opposite sides of said array of commutator bars.

4. The switching apparatus of claim 1 wherein said first and second actuating means each comprises first and second electrically connected brush assemblies rotatable with said rotor assembly for respectively wipingly engaging one of said conductive rings and said commutator bars.

5. Switching apparatus for a machine responsive to a source of DC power and having interacting rotor and stator assemblies which rotate relative to each other, the rotor having at least a two-pole permanent magnet structure for creating a magnetic field and the stator having a winding with a plurality of energizeable coils arranged at spaced intervals around the stator, said coils having an array of commutator bars associated therewith for supplying electrical power thereto for progressively creating magnetic fields in said stator which interact with those in said rotor, said apparatus comprising:
 a. first and second spaced conductive rings associated with said stator, said conductive rings being positioned proximate said commutator bars;
 b. means for respectively coupling each of said conductive rings to opposite polarities of said DC source; and
 c. drum means associated with said rotor and adapted to rotate therewith, said drum means having first and second actuating means mounted thereon, said first and second actuating means each comprising brush assemblies adapted to progressively and sequentially electrically couple said first and second conductive rings to the commutator bars during the relative rotation so as to momentarily and progressively couple each coil to both polarities of said source and to couple each subsequent coil across said source before the preceding coil is decoupled from said source.

6. The apparatus of claim 5 wherein said first and second actuating means each comprises first and second brush assemblies for respectively wipingly engaging said first and second conductive rings and said commutator bars.

7. The apparatus of claim 6 wherein said first and second brush assemblies are angularly displaced from one another about said drum means so as to simultaneously engage commutator bars associated with the same coil.

8. The apparatus of claim 5 wherein said drum means comprises a cylindrical shaped insulating member having openings for receiving said brush assemblies and wherein each brush assembly comprises a brush member slidably mounted in one of said drum openings and spring biased radially outward.

9. The apparatus of claim 1 wherein the longitudinal axes of said commutator bars are offset at an angle relative to the rotating axis of said rotor shaft.

* * * * *